Patented Nov. 5, 1935

2,019,632

UNITED STATES PATENT OFFICE 2,019,632

METHOD OF REMOVING OXYGEN FROM GAS MIXTURES

Arthur B. Ray, Bayside, N. Y., assignor to Carbide and Carbon Chemicals Corporation, a corporation of New York No Drawing. Application June 3, 1933, Serial No. 674,217

8 Claims. (Cl. 23—2)

This invention relates to a process for removing oxygen from gas mixtures containing the same. It is especially adapted for removing small volumes of oxygen which may be present as a contaminant in large volumes of other gases. A particular application of the invention, as will be described herein, relates to the removal of oxygen in the purifying of helium and helium gas mixtures.

Helium when used as the lifting gas in dirigible aircraft must be periodically purified, as it gradually becomes contaminated with other gases which diffuse into it through the container bags. When liquid fuel is used for the engines the contaminants ordinarily include only nitrogen, oxygen, carbon dioxide and water vapor. These gases can be removed without great difficulty by absorbing the carbon dioxide and water vapor with appropriate absorbents, and removing the nitrogen and oxygen by liquefaction. When gaseous fuels such as ethane or other hydrocarbon gases and hydrogen are used, these combustible gases may also diffuse into the helium. This presents a much more complicated purification problem, since it is desirable to completely remove either the oxygen or the combustible gases before the compression and liquefaction steps, in order to eliminate the explosion hazard. Under ordinary conditions about ten percent of hydrogen in the helium is permissible, because such a mixture will not burn or explode and has a desirable lifting power. For this reason, as well as others, it has therefore been found desirable to remove the oxygen rather than the combustible gas by a pretreatment.

Heretofore attempts have been made to remove the oxygen by a catalytic process, in which the hydrogen is caused to combine with the oxygen to form water. A sensitive copper catalyst will under carefully controlled conditions cause the desired reaction, but such a process is subject to serious difficulties when applied to the continuous treatment of large volumes of gas. The method, for instance, is not applicable at all unless sufficient hydrogen is present to combine with all of the oxygen, and poisoning of the copper catalyst, a danger which is always present, will entirely prevent the reaction desired. This process has therefore proved unreliable in commercial use.

It is an object of my invention to provide means for removing the oxygen from contaminated helium gas, by a pretreatment process which is not subject to the difficulties heretofore encountered, and which is reliable, efficient, and economical in its commercial application.

I have found that substantially complete deoxygenation of helium gas mixtures can be effected by contacting the gas with heated highly reactive carbon, preferably of the type known as activated carbon. In the presence of heated carbon the oxygen will combine with the hydrogen or with the carbon if hydrogen is absent, so that the carbon acts in the reaction both as a combustible and a catalyst. If other combustible gases are present some of the oxygen may also be caused to combine with them. A large excess of carbon will insure complete oxygen removal from any gas mixture, and the temperature, as well as the time of contact of the gas with the carbon, may be so controlled that the formation of carbon monoxide is held to a minimum. The usual catalyst poisons have no detrimental effect on this method of deoxygenation, and with simple control, a positive action is assured.

A large number of tests have been made on a variety of helium mixtures within the range of contamination normally encountered when it becomes necessary to purify the helium. The following approximate compositions are representative of those which may be met with, and which have been successfully deoxygenated by my method.

*Composition—Percent by volume*

|          | A  | B  | C   | D  |
|----------|----|----|-----|----|
| Helium   | 72 | 80 | 80  | 72 |
| Hydrogen | 8  |    | 3.6 | 8  |
| Ethane   |    | 10 | 6.4 | 10 |
| Nitrogen | 16 | 8  | 8   | 8  |
| Oxygen   | 4  | 2  | 2   | 2  |

The predominating oxygen-containing compounds formed by this reaction are water and carbon dioxide. A very small amount of carbon monoxide may be formed in some cases, but this can be held, by use of the proper carbon and by proper control of the contact time and temperature, to amounts in no way detrimental to the subsequent steps of the purifying process. If hydrogen is present in the gas being treated there is indication that it is preferentially oxidized and that only about 10% to 40% of the oxygen present will react with the carbon, whereas if ethane is the only combustible gas present 40% to 50% of the oxygen will react with the carbon. In either instance the carbon acts both as a combustible and a contact agent to cause oxidation of the combustible gases present, and the rate of consumption of the carbon will obviously depend upon the composition of the gas mixture being treated.

As there is a tendency toward increased formation of carbon monoxide with increase in contact time, the gas should be allowed to contact with the hot carbon only just long enough to give complete oxygen removal. The actual contact time may therefore, vary somewhat with the composition of the gas mixture, but I have found that 2 to 3 seconds is usually sufficient. The temperature of the carbon must also be controlled so that it is high enough to cause a very rapid reaction between oxygen and carbon, and still low enough to prevent, in a short contact time, the formation of appreciable amounts of carbon monoxide by the reaction of carbon dioxide and carbon. A temperature of 600° C. has been found to be quite suitable, although an optimum temperature somewhat higher or lower may be appropriate with certain gas mixtures.

Activated carbon has previously been mentioned as the preferred form for my purpose since there appears to be less tendency with this carbon toward the formation of carbon monoxide. Other forms of highly reactive carbon may however be used, among which coconut charcoal, wood charcoal, and wood charcoal impregnated with small amounts of copper, have all proven to be suitable. Whatever form of carbon is used it is desirable that it be calcined to a temperature somewhat higher than that to which it is to be heated in the deoxygenating apparatus. It is also desirable that carbon be in the form of small particles, 6 to 20 mesh material being suitable.

The particular apparatus employed in the commercial application of my new process is of no concern to the present invention, but the following facts should be considered with reference to the equipment necessary for operating on a commercial scale.

It will be assumed that a plant having a maximum capacity for treating 30,000 cubic feet of gas per hour is desired. As I have shown, complete deoxygenation of the gas mixture can be effected by a contact of 2 to 3 seconds between the gas and the carbon, at a temperature of 600° C. and at practically atmospheric pressure. Suppose 2.5 seconds is taken as the actual time of contact. The 30,000 cubic feet of gas at ordinary temperature (20° C.) and pressure will expand to approximately 90,000 cubic feet at 600° C. and atmospheric pressure. This means that 25 cu. ft. of gas at 600° C. must be treated per second, and the volume of carbon necessary to give a contact of 2.5 seconds at this rate must be 62.5 cu. ft. The weight of this volume of carbon will be about 2063 pounds for a commercial grade of active carbon of a fineness of 6 to 20 mesh, 2500 pounds for coconut charcoal, and 938 pounds for wood charcoal, both the latter carbons having a fineness of 8 to 14 mesh.

A container must therefore be provided capable of holding carbon in the amounts mentioned. This container should preferably be of a type which will permit passage of the gas directly into and through the carbon bed, and it must be such as will permit heating of the carbon to a temperature of at least 600° C., preferably by passing preheated gas into it. The carbon is gradually consumed in the reaction, and means should therefore be provided for periodically or continuously adding carbon to the container. It is also advisable to keep on hand a spare deoxygenator, which is ready at any time for immediate use.

The deoxygenator should be connected with the rest of the purification equipment, so that the gas on leaving it passes directly from a heat exchanger to scrubbers for removing the carbon dioxide, and is then dried, probably by a solid dehydrating agent. The equipment for removing carbon dioxide and water should have sufficient capacity to remove the maximum amount of these impurities which might be encountered under the worst conditions. For example, assuming that the gas to be treated contains 4% oxygen, and that the oxygen may go either entirely to water or entirely to carbon dioxide, it would be necessary to remove a maximum amount of approximately 4.6 pounds of carbon dioxide, or 3.8 pounds of water from each 1000 cu. ft. of gas treated. The gas after being freed of oxygen, carbon dioxide, and water may then be passed to compression and liquefaction apparatus for the removal of ethane, nitrogen, and possibly a small amount of carbon monoxide. The hydrogen content of the purified gas can always be kept below 10% by introducing sufficient air into the raw gas to oxidize the excess hydrogen in the deoxygenator.

In the application of my invention as herein described, it is assumed that the gas is treated under approximately atmospheric pressure. Since it is necessary in the later stages of the purification process to compress the gas, it is entirely feasible to compress it to a moderate pressure before introducing it into the deoxygenator. This will of course permit the use of smaller equipment, with the same gas treating capacity.

While the invention is especially adapted for the treatment of helium gas mixtures, it may also be equally suitable in the treatment of other gas mixtures, where removal of oxygen is desired.

The invention should not be limited other than as defined in the appended claims.

I claim:—

1. A method of removing oxygen from large volumes of gas mixtures containing the same in an amount not substantially greater than 4%, which comprises contacting the gas mixture with highly reactive carbon heated to a temperature of about 600° C., the contact time being only sufficient to combine substantially all oxygen into compounds other than carbon monoxide.

2. A method of removing oxygen from large volumes of gas mixtures containing the same in an amount not substantially greater than 4%, which comprises contacting the gas mixture for a period of 2 to 3 seconds with highly reactive carbon, said carbon being heated to a temperature of about 600° C.

3. A method of removing small quantities of oxygen from large volumes of helium gas contaminated therewith, which comprises contacting the gas mixture for a period of 2 to 3 seconds with activated carbon heated to a temperature of at least 600° C.

4. A method of purifying helium gas contaminated with other gases including minor proportions of oxygen and a combustible gas, which comprises first removing the oxygen by contacting the gas mixture with heated highly reactive carbon, to combine substantially all the oxygen into compounds other than carbon monoxide, and subsequently removing other gases by liquefaction.

5. A method of purifying helium gas contaminated with other gases including minor proportions of oxygen and a combustible gas, which comprises first removing the oxygen by contacting the gas with highly reactive carbon heated to a temperature of about 600° C., to combine substantially all the oxygen into compounds other than carbon monoxides, and subsequently removing other gases by liquefaction.

6. A method of purifying helium gas contaminated with other gases including oxygen and a combustible gas, which comprises first removing the oxygen by contacting the gas mixture for a period of 2 to 3 seconds with highly reactive carbon heated to a temperature of about 600° C., and subsequently removing other gases by liquefaction.

7. A method of purifying helium gas contaminated with other gases including minor proportions of oxygen and a combustible gas, which comprises passing the gas mixture through a bed of heated activated carbon, whereby the oxygen is converted to carbon dioxide and water; removing the carbon dioxide and water by scrubbing and drying; and subsequently removing other gases by liquefaction.

8. A method of purifying helium gas contaminated with other gases including oxygen and a combustible gas, which comprises contacting the gas mixture for a period of about 2.5 seconds with a bed of activated carbon heated to a temperature of about 600° C., whereby the oxygen is converted to carbon dioxide and water; removing the carbon dioxide and water by scrubbing and drying; and subsequently removing other gases by liquefaction.

ARTHUR B. RAY.